United States Patent [19]
Davis

[11] Patent Number: 5,793,283
[45] Date of Patent: Aug. 11, 1998

US005793283A

[54] PAGER VEHICLE THEFT PREVENTION AND RECOVERY SYSTEM

[76] Inventor: Ronnie Davis, P.O. Box 666, Mapleton, Ga. 30059

[21] Appl. No.: 792,948

[22] Filed: Jan. 21, 1997

[51] Int. Cl.⁶ .................................................. B60R 25/10
[52] U.S. Cl. ........................ 340/426; 340/988; 307/10.2
[58] Field of Search .................................. 340/426, 428, 340/988, 989, 825.44; 307/10.2; 342/457; 364/449.7; 379/59

[56] References Cited

U.S. PATENT DOCUMENTS

| | | | |
|---|---|---|---|
| 3,703,714 | 11/1972 | Andrews | 340/426 |
| 3,893,069 | 7/1975 | Mason | 340/428 |
| 4,354,174 | 10/1982 | Heidman | 340/428 |
| 4,463,340 | 7/1984 | Adkins | 340/428 |
| 4,665,379 | 5/1987 | Howell | 340/428 |
| 5,515,043 | 5/1996 | Berard | 342/457 |
| 5,543,776 | 8/1996 | L'Esperance | 340/426 |
| 5,625,668 | 4/1997 | Loomis | 342/457 |
| 5,677,664 | 10/1997 | Sawinski | 340/426 |

Primary Examiner—Brent A. Swarthout
Assistant Examiner—Anh La

[57] ABSTRACT

A pager vehicle theft prevention and recovery system including an electronic transceiver and associated global positioning system(GPS) discreetly situated within a vehicle and coupled to an associated alarm system. The transceiver is adapted to transmit a pager electronic alarm signal via free space upon the activation of the alarm system. The system further comprises a remotely positionable portable receiver such as a conventional pager for receiving the pager electronic alarm signal from the transceiver via free space and further providing an audible alarm to a user. Upon verification that the vehicle is indeed stolen, the user may instruct the transceiver to transmit a continuous pager signal containing longitudinal and latitudinal coordinates generated by the GPS. To activate the transceiver in such a mode, a recovery signal may be deployed from a conventional phone or in the alternative be transmitted directly from the remotely positionable portable receiver. The longitudinal and latitudinal coordinates allow the car to be traced and recovered.

1 Claim, 3 Drawing Sheets

PAGER VEHICLE THEFT PREVENTION AND RECOVERY SYSTEM

BACKGROUND OF THE INVENTION

1. Field of the Invention

The present invention relates to a pager vehicle theft prevention and recovery system for use with a motor vehicle and more particularly pertains to providing an alarm indication to a user and allowing a vehicle to be traced when unauthorized access is detected, wherein all communication between components associated with the present invention is afforded via a pager network.

2. Description of the Prior Art

The use of vehicle anti-theft devices is known in the prior art. More specifically, vehicle anti-theft devices heretofore devised and utilized for the purpose of providing an alarm when a vehicle is stolen are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,081,667 to Drori et al. discloses a system for integrating a pager telephone with a vehicle's security system. U.S. Pat. No. 5,113,427 to Ryoichi et al. discloses a radio-signal-responsive vehicle device control system. U.S. Pat. No. 5,185,779 to Dop et al. discloses a pager alarm backup system. U.S. Pat. No. 5,225,713 to Henneberry et al. discloses a mobile security system. U.S. Pat. No. 5,255,307 to Mizikovsky discloses a status indicator control for a pager mobile telephone system. U.S. Pat. No. 5,334,974 to Simms et al. discloses a personal security system.

While these devices fulfill their respective, particular objective and requirements, the aforementioned patents do not describe a pager vehicle theft prevention and recovery system that provides an alarm to a location distant to the motor vehicle when the vehicle is being stolen and also provides a method of tracing the vehicle by continuously transmitting a pager signal.

In this respect, the pager vehicle theft prevention and recovery system according to the present invention substantially departs from the conventional concepts and designs of the prior art, and in doing so provides an apparatus primarily developed for the purpose of providing an alarm indication to a user and allowing a vehicle to be traced when unauthorized access is detected, wherein all communication between components associated with the present invention is afforded via a pager network.

Therefore, it can be appreciated that there exists a continuing need for new and improved pager vehicle theft prevention and recovery system which can be used for providing an alarm indication to a user and allowing a vehicle to be traced when unauthorized access is detected, wherein all communication between components associated with the present invention is afforded via a pager network. In this regard, the present invention substantially fulfills this need.

SUMMARY OF THE INVENTION

In the view of the foregoing disadvantages inherent in the known types of vehicle anti-theft devices now present in the prior art, the present invention provides an improved pager vehicle theft prevention and recovery system. As such, the general purpose of the present invention, which will be described subsequently in greater detail, is to provide a new and improved pager vehicle theft prevention and recovery system and method which has all the advantages of the prior art and none of the disadvantages.

To attain this, the present invention essentially comprises a switching matrix including a plurality of switches coupled through cabling to a trunk, hood, a plurality of doors, and battery of a conventional vehicle. Each switch of the switching matrix is used for transmitting an indication of when the door, trunk, or hood is opened, either separately or in combination. An authorization mechanism is included for deploying an authorization signal upon proper identification of one gaining access to the vehicle. Also provided is an electronic control mechanism formed of a conventional microprocessor. The control mechanism is coupled to the switch matrix, authorization mechanism, horn, set of lights, and battery of the vehicle. The control mechanism is placed in an active mode in response to the indication from the switch matrix and lack of receipt of the authorization signal from the authorization mechanism. In the active mode, the control mechanism sounds the horn and flashes the set of headlights of the motor vehicle after a predetermined time of preferably about 30 seconds. The control mechanism further generates a remote alarm activation signal immediately upon being transferred to the active mode. An electronic transceiver is coupled to the electronic control mechanism for transmitting a designated electronic alarm signal via free space upon receipt of the remote alarm activation signal. An electronic receiver formed of a conventional pager is also provided. The receiver produces an audible alarm upon the receipt of the designated electronic alarm signal from the electronic transceiver. Also included is a global positioning system(GPS) adapted to continuously generate a plurality of latitudinal coordinates and longitudinal coordinates upon the receipt of a pager recovery signal. The pager recovery signal is transmitted via a conventional phone by dialing a designated number. The coordinates specifically correspond to the location of the vehicle. Lastly, the electronic transceiver is further adapted to transmit the latitudinal coordinates and longitudinal coordinates via a continuous pager signal upon the receipt of the pager recovery signal. The continuous pager signal allows the car to be traced by a party receiving the signal. Preferably, the recipient of the continuous signal containing the coordinates is either a police station or alarm company.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pager vehicle theft prevention and recovery system which has all the advantages of the prior art vehicle anti-theft devices and none of the disadvantages.

It is another object of the present invention to provide a new and improved pager vehicle theft prevention and recovery system which may be easily and efficiently manufactured and marketed.

It is a further object of the present invention to provide a new and improved pager vehicle theft prevention and recovery system which is of durable and reliable construction.

An even further object of the present invention is to provide a new and improved pager vehicle theft prevention and recovery system which is susceptible of a low cost of manufacture with regard to both materials and labor, and which accordingly is then susceptible of low prices of sale to the consuming public, thereby making such a pager vehicle theft prevention and recovery system economically available to the buying public.

Still yet another object of the present invention is to provide a new and improved pager vehicle theft prevention and recovery system which provides in the apparatuses and methods of the prior art some of the advantages thereof, while simultaneously overcoming some of the disadvantages normally associated therewith.

Even still another object of the present invention is to provide an alarm indication to a user and allowing a vehicle to be traced when unauthorized access is detected, wherein all communication between components associated with the present invention is afforded via a pager network.

Another object of the present invention is to delay any visual or audible alarm until after a predetermined amount of time thereby allowing a user to deactivate the system in the case of a false alarm.

Still yet another object of the present invention is to allow a user to effect the tracking of a vehicle immediately upon the indication that the vehicle is indicated stolen without having to locate a phone.

Lastly, it is an object of the present invention to provide a new and improved pager vehicle theft prevention and recovery system including an electronic transceiver and associated global positioning system(GPS) discreetly situated within a vehicle and coupled to an associated alarm system. The transceiver is adapted to transmit a pager electronic alarm signal via free space upon the activation of the alarm system. The system further comprises a remotely positionable portable receiver such as a conventional pager for receiving the pager electronic alarm signal from the transceiver via free space and further providing an audible alarm to a user. Upon verification that the vehicle is indeed stolen, the user may instruct the transceiver to transmit a continuous pager signal containing longitudinal and latitudinal coordinates generated by the GPS. To activate the transceiver in such a mode, a recovery signal may be deployed from a conventional phone or in the alternative be transmitted directly from the remotely positionable portable receiver. The longitudinal and latitudinal coordinates allow the car to be traced and recovered.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figures 1, 2:
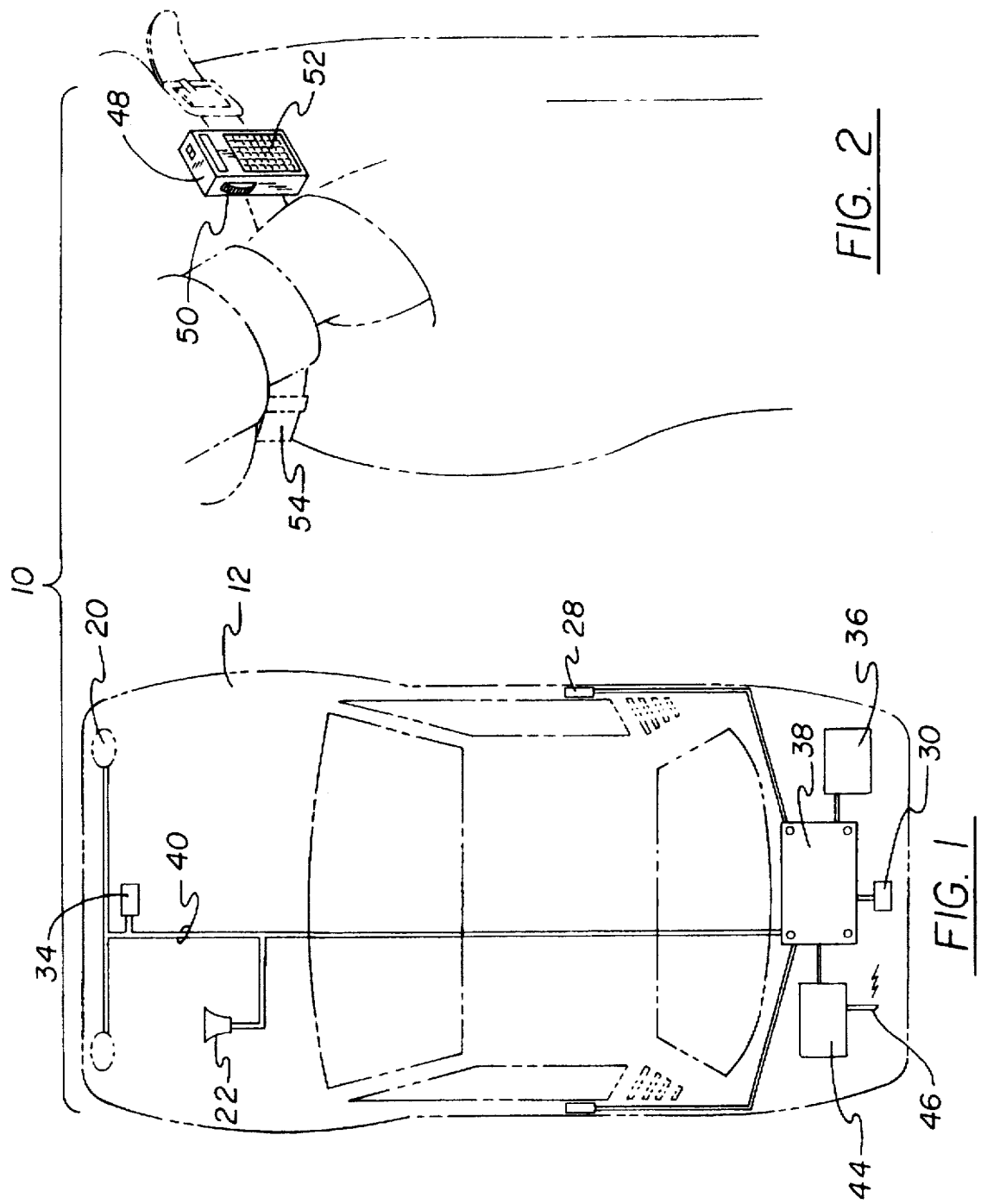
FIG. 1 is a plan view of a proximally positioned portion of the preferred embodiment secured of the present invention within a motor vehicle.
FIG. 2 is the remotely positioned portion of the preferred embodiment of the present invention secured to a user's belt.
Figure 3:
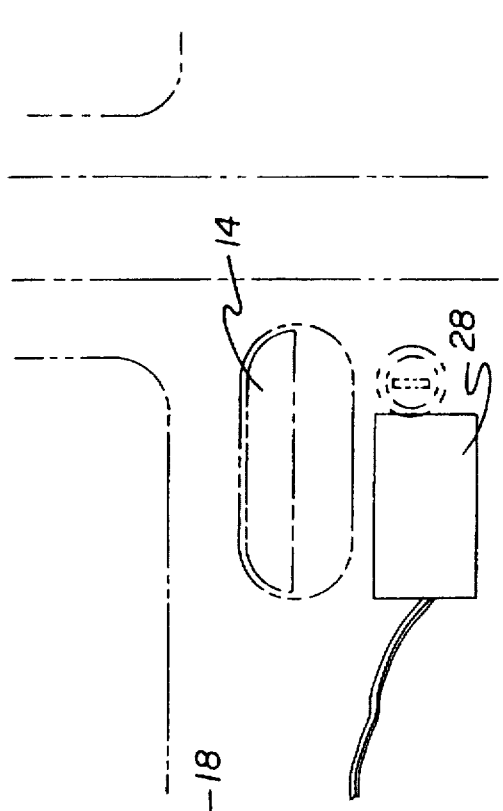
FIG. 3 is a plan view of a switch engaged with the hood of the motor vehicle for providing an indication of when the hood is opened.
Figure 5:
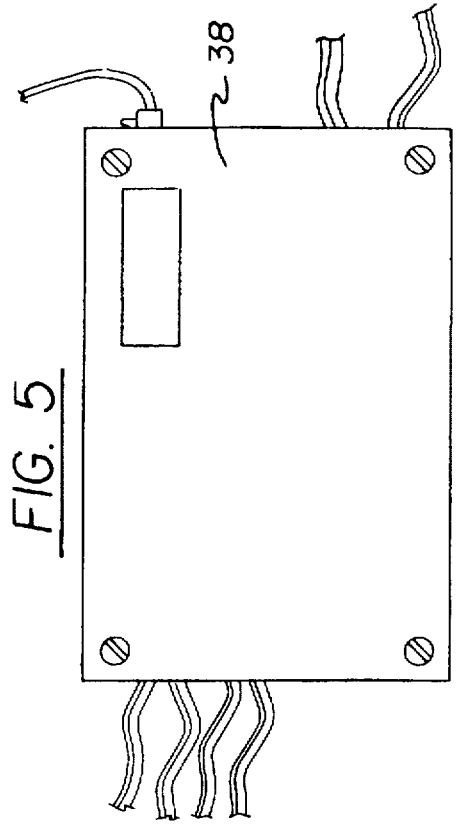
FIG. 5 is a plan view of a switch secured to a door of a motor vehicle for providing an indication when the door is opened.
Figure 4:
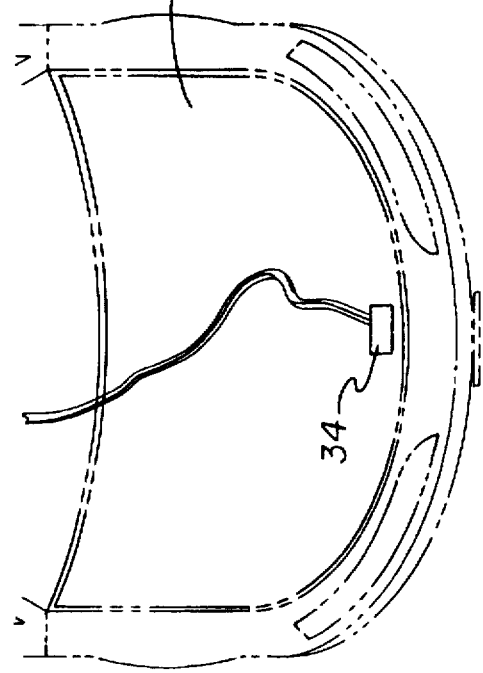
FIG. 4 is a switch secured to the trunk of the motor vehicle for providing an indication when the trunk is opened.
Figure 6:
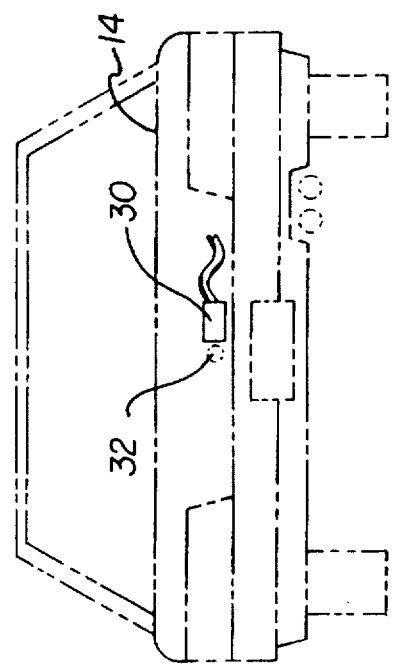
FIG. 6 is a plan view of the control mechanism of the present invention which controls activation and deactivation of the audible, visual, and remote alarms of the present invention.
Figure 7:
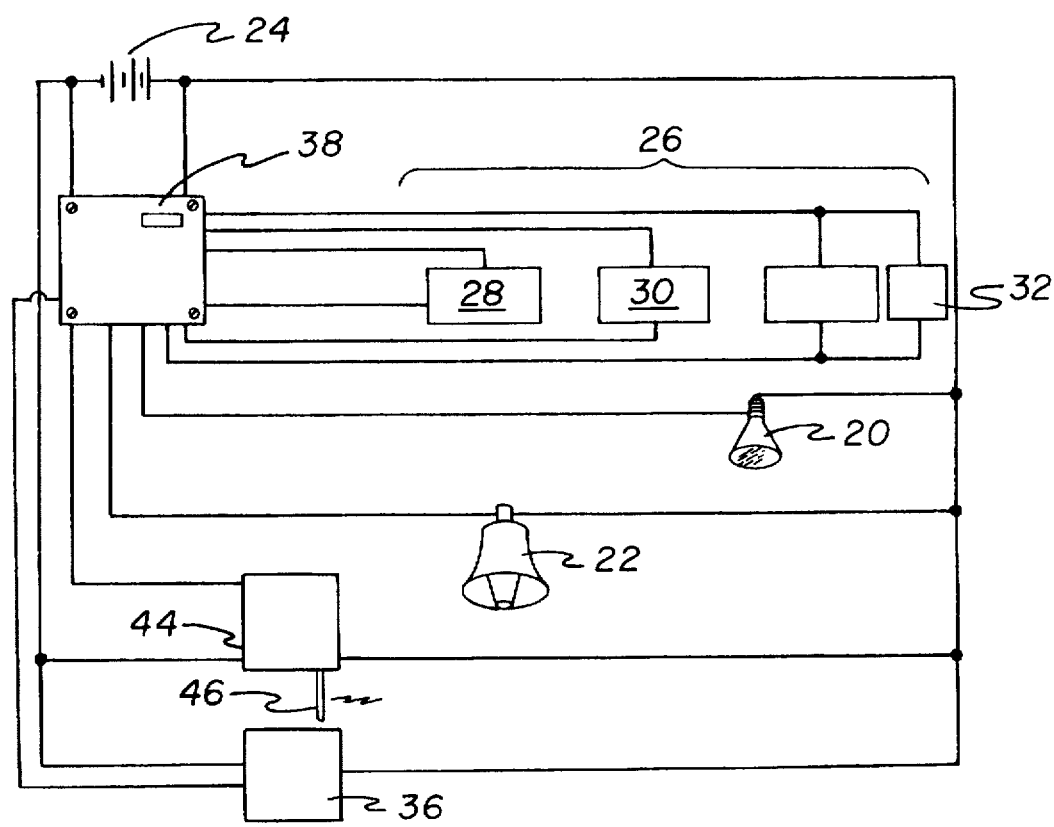
FIG. 7 is a schematic diagram of the proximally positioned portion of the present invention that is secured to a motor vehicle.

With reference now to the drawings, and in particular, to FIG. 1 thereof, the preferred embodiment of the new and improved pager vehicle theft prevention and recovery system embodying the principles and concepts of the present invention and generally designated by the reference number 10 will be described.

The preferred embodiment of the present invention comprises a plurality of components. In their broadest context, such components include a switch matrix, authorization mechanism, control mechanism, GPS, transceiver mechanism, and portable receiver mechanism. Such components are individually configured and correlated with respect to each other to create a system that provides an alarm indication and allows tracking of a vehicle when unauthorized access is detected.

The present invention is adapted for use with a conventional motor vehicle 12. The motor vehicle has one or two openable doors. Each door is opened through use of a conventional latch 14. The vehicle also includes an openable trunk 16 and hood 18, a set of headlights 20 or ancillary warning lights, and an electrically actuatable horn 22. In addition, a battery 24 or other power source such as an alternator is connected to the horn and the set of headlights with cabling and provides electrical energy for their operation.

A switching matrix 26 is included. The switching matrix includes a first switch 28 coupled to the door, a second switch 30 coupled to the trunk near its latch 32, and a third switch 34 coupled to the hood. In addition, the switching matrix is coupled to the battery. Each switch of the switching matrix is used for transmitting an indication of when the door, the trunk, or the hood is opened, either separately or in any combination.

An authorization mechanism 36 is included for deploying an authorization signal upon proper identification of one gaining access to the vehicle. Such identification may be accomplished by any one of a plurality of conventional methods including a remote radio signal or key and lock combination.

Also provided is an electronic control mechanism 38 formed of a conventional microprocessor. The control mechanism is coupled to the switch matrix, the horn, the set of headlights, and the battery through cable 42. The control mechanism is placed in an active mode in response to the indication from the switch matrix and lack of receipt of the authorization signal from the authorization mechanism. The control mechanism generates a remote alarm activation signal immediately upon being transferred to the active mode. Further in the active mode, the control mechanism sounds the horn and flashes the set of headlights of the motor vehicle. For reasons that will become apparent later, upon being placed in the active mode, it is imperative that the control mechanism sound the horn and flash the headlights of the vehicle only after a predetermined time of preferably about 30 seconds.

Also included is a global positioning system(GPS) 43 adapted to continuously generate a plurality of latitudinal coordinates and longitudinal coordinates upon the actuation thereof. Activation is afforded by the receipt of a pager recovery signal. Such a signal is transmitted via a conventional phone by dialing a designated number. The coordinates specifically correspond to the location of the vehicle. It is imperative that the recovery signal utilize a pager network in lieu of other communication networks such as cellular systems. By utilizing a pager network for delivering the recovery signal, required monthly rates and the cost of sending of the recovery signal itself is reduced.

An electronic transceiver 44 is coupled to the electronic control mechanism and GPS for transmitting a designated electronic alarm signal via free space upon receipt of the remote alarm activation signal. The electronic transceiver is adapted to allow selective changing of the designated electronic alarm signal upon the discretion of a user. Such selective changing consists of setting the electronic transceiver to call a certain telephone number. The designated electronic alarm signal resembles that which is employed in the art of pagers. The electronic transceiver is further adapted to transmit the latitudinal coordinates and longitudinal coordinates via a continuous pager signal upon the receipt of the pager recovery signal. The continuous pager signal allows the car to be traced by a party receiving the signal. Preferably, the recipient of the signal containing the coordinates is either a police station or alarm company. The latitudinal coordinates and longitudinal coordinates may take the form of a computer pulse indication or the like depending on the preference of the recipient. As a back-up method of tracing the vehicle, the pager signal itself may be used to triangulate the location of the vehicle. Such a method could employ either a plurality of pager transceiver stations or satellites depending on the technology employed in communicating the pager signals.

Similar to the recovery signal, the pager electronic alarm signal and the method of which the transceiver transmits the coordinates utilize pager networks. As indicated before, the employment of a pager network for delivering the signals reduce the required monthly rates and the cost of the transmission thereof. Currently, pagers are utilized primarily for prompting a call and further relaying information such as sport updates, weather, and the like. Such capability of transferring data is utilized by the present invention to afford the transmission of the latitudinal coordinates and longitudinal coordinates.

In addition, the transceiver includes a conventional antenna mechanism 46. The antenna mechanism is coupled thereto and radiates the pager electronic alarm signal and continuous pager signal containing the coordinates into free space. The transceiver is formed of conventional and commercially available electronic components and mechanical parts.

Lastly, a remotely positionable and hand-carriable electronic receiver mechanism formed of a conventional pager 48 is provided. The receiver mechanism receives via free space the designated electronic alarm signal from the transceiver and then provides an alarm. It is now apparent that by delaying the activation of the horn and headlights of the vehicle upon the electronic control means being placed in an active mode, a user may quickly transfer the electronic control means back to an inactive mode by providing the authorization signal so that the headlights and horn are not activated. This feature prevents activation of the horn and headlights during a false alarm. The pager alarm can be of the tactile, visual, or audible form, or combination thereof. Preferably, the pager emits an audible tone. The receiver of the pager is encased in a housing 52 and is securable to a belt 54 of a user through a clip or fastener.

As such, the present invention is ideally suited for use on a motor vehicle and is used to prevent motor vehicle theft and further to locate and recover a stolen car. When the system is supplied with power, it is in the standby mode. After a person opens the door, trunk, or hood of the vehicle and fails to be properly identified, the present invention will be placed in an activated mode and will transmit the pager electronic alarm signal via free space to notify a user through use of the receiver. Upon the discovery of the fact that the vehicle was stolen, a conventional phone may be utilized to allow the transceiver to transmit a continuous pager signal containing the coordinates required for the tracing of the vehicle. In the present embodiment, such is accomplished by utilizing a conventional phone to dial a designated number which corresponds to a pager number of the transceiver means.

In an alternate embodiment, the above receiver means is further equipped with a transmitter adapted to emit therefrom via free space the recovery signal. Such transmission is afforded upon the depression of an unillustrated recovery activation signal button. By this structure, a user is not required to seek a phone or the like to effect the transmission of the recovery signal. Instead, the user may initiate the transmission of the coordinates immediately after informed that the automobile has been stolen. It should be noted that the present embodiment utilizes technology presently utilized for allowing a user to respond to a page by employing an incorporated transmitter to page the person that initially sent the page.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A pager vehicle theft prevention and recovery system for providing an alarm indication when unauthorized access to the motor vehicle is detected and further allowing the vehicle to be traced thereafter, the pager vehicle theft prevention and recovery system comprising, in combination:

a motor vehicle having at least one openable door, a trunk, a hood, a set of headlights, an electrically actuatable horn, and a power source coupled to the horn and the set of headlights;

switch means coupled to the door, the trunk, the hood, and the power source of the motor vehicle for transmitting an indication of when the door, the trunk, and the hood are opened;

an authorization means for deploying an authorization signal upon proper identification of a person gaining access to the vehicle;

electronic control means coupled to the switch means, the horn, the set of headlights, and the power source, the electronic control means being placed in an active mode in response to the indication from the switch means and lack of receipt of the authorization signal from the authorization means for sounding the horn and illuminating the set of headlights after a predetermined amount of time of 30 seconds and immediately generating a remote alarm activation signal;

a global positioning system adapted to continuously generate a plurality of latitudinal coordinates and longitudinal coordinates upon the receipt of a recovery signal, the coordinates corresponding to the location of the vehicle, the recover signal including a pager signal generated by the dialling of a predetermined phone number which utilizes a pager network;

an electronic transceiver coupled to the electronic control means and global positioning system for transmitting a pager electronic alarm signal via free space upon the receipt of the remote alarm activation signal, the electronic transceiver adapted to allow selective changing of the designated electronic alarm signal, the electronic transceiver further adapted to transmit the latitudinal coordinates and longitudinal coordinates via a continuous pager signal upon the receipt of the recovery signal thereby allowing the car to be traced; and a remotely positionable and hand-carriable receiver means for receiving via free space the designated electronic alarm signal from the transceiver and then providing an alarm, the receiver means further including a transmitter for emitting the recovery signal in additional to dialing said phone number upon the depression of a recovery activation signal button situated thereon.

* * * * *